United States Patent
Dambach et al.

(10) Patent No.: US 7,596,070 B2
(45) Date of Patent: Sep. 29, 2009

(54) DEVICE FOR READING AND/OR WRITING OPTICAL RECORDING MEDIA

(75) Inventors: Sören Dambach, Karlsruhe (DE); Hartmut Richter, Villingen-Schwenningen (DE)

(73) Assignee: Thomson Licensing, Boulogne, Billancourt (FR)

( * ) Notice: Subject to any disclaimer, the term of this patent is extended or adjusted under 35 U.S.C. 154(b) by 661 days.

(21) Appl. No.: 10/296,799

(22) PCT Filed: May 29, 2001

(86) PCT No.: PCT/EP01/06105

§ 371 (c)(1), (2), (4) Date: Nov. 26, 2002

(87) PCT Pub. No.: WO01/93254

PCT Pub. Date: Dec. 6, 2001

(65) Prior Publication Data

US 2003/0165106 A1 Sep. 4, 2003

(30) Foreign Application Priority Data

May 30, 2000 (DE) ............... 100 26 484

(51) Int. Cl.
G11B 7/00 (2006.01)
(52) U.S. Cl. .......................... 369/112.03
(58) Field of Classification Search ............ 369/112.07; G11B 7/00
See application file for complete search history.

(56) References Cited

U.S. PATENT DOCUMENTS

| | | | | |
|---|---|---|---|---|
| 4,530,080 A * | 7/1985 | Aoi et al. | ........... | 369/44.13 |
| 4,817,072 A * | 3/1989 | Toide et al. | ........... | 369/44.37 |
| 6,043,911 A * | 3/2000 | Yang | ........... | 359/15 |
| 6,072,579 A * | 6/2000 | Funato | ........... | 356/457 |
| 6,122,104 A * | 9/2000 | Nakai | ........... | 359/576 |
| 6,211,511 B1 * | 4/2001 | Shih et al. | ........... | 250/214 R |
| 6,353,587 B1 * | 3/2002 | Hong et al. | ........... | 369/112.15 |
| 6,366,542 B1 * | 4/2002 | Kojima et al. | ........... | 369/44.23 |
| 6,392,977 B2 * | 5/2002 | Ando et al. | ........... | 369/112.01 |

(Continued)

FOREIGN PATENT DOCUMENTS

EP 511 023 A1 10/1992

(Continued)

OTHER PUBLICATIONS

Search Report.

*Primary Examiner*—Joseph H Feild
*Assistant Examiner*—Joseph Haley
(74) *Attorney, Agent, or Firm*—Robert D. Shedd; Robert B. Levy (57) ABSTRACT

The present invention relates to an appliance for reading from and/or writing to optical recording media 1 having a first laser diode LD1 for producing a first scanning beam AS1 at a first wavelength $\lambda_1$ and having a second laser diode LD2 for producing a second scanning beam AS2 at a second wavelength $\lambda_2$, with the scanning beams AS1, AS2 running along a common optical axis 9, scanning an information layer 6 on the recording medium 1 and falling on a single photodetector 8 in order to produce an information signal IS, with a beam combination element being arranged at one point on the optical axis 9. According to the invention, the beam combination element is a diffraction grating 12.

13 Claims, 5 Drawing Sheets

U.S. PATENT DOCUMENTS 6,434,092 B1 * 8/2002 Katayama ................. 369/44.23
6,487,015 B2 * 11/2002 Kitamura et al. ............ 359/558

FOREIGN PATENT DOCUMENTS

| | | | |
|---|---|---|---|
| EP | 973 160 A1 | 1/2000 | |
| JP | 10261240 | 9/1998 | |
| JP | 10261241 | 9/1998 | |
| JP | 11149657 | 6/1999 | |

* cited by examiner

| n | -3 | -2 | -1 | 0 | 1 | 2 | 3 | 4 | 5 |
|---|---|---|---|---|---|---|---|---|---|
| Blaze (650nm) | 0 | 0 | 0 | 0 | 100 | 0 | 0 | 0 | 0 |
| Blaze (780nm) | 0.2 | 0.3 | 0.8 | 3.6 | 91.2 | 1.9 | 0.5 | 0.3 | 0.1 |
| 4-step (650nm) | 9.0 | 0 | 0 | 0 | 81.1 | 0 | 0 | 0 | 3.2 |
| 4-step (780nm) | 8.3 | 1.0 | 1.3 | 4.2 | 74.3 | 1.0 | 0.1 | 0 | 3.0 |

Fig. 11

DEVICE FOR READING AND/OR WRITING OPTICAL RECORDING MEDIA

This application claims the benefit under 35 U.S.C. § 365 of International Application PCT/EP01/06105, filed May 29, 2001, which claims the benefit of German Patent Application No. 10026484.0, filed May 30, 2000.

The present invention relates to an appliance for reading from and/or writing to optical recording media, which appliance uses scanning beams at different wavelengths, which scanning beams run along a common optical axis, scan the recording medium, and are detected by a single photodetector. In particular, the appliance has an optical scanner for replaying and recording data on optical rewritable disks.

Optical scanners, which can both replay and write to Digital Versatile Disks (DVD) and Compact Disks (CD), require two different laser wavelengths. For this reason, CD-compatible DVD players and recorders are fitted with two different laser diodes. This discrete construction results in increased financial costs due to the additionally required optical components. Recently, so-called twin laser diodes have been available as one approach to reduce the number of components required. These comprise two laser diodes at different wavelengths, which are mounted laterally separated in a common laser housing.

The lateral separation of the two light sources results in the emitted radiation through the optical system of the scanner being imaged at two mutually separate light spots in the information-carrying layer of the optical disk. This means that two laterally separate foci are in turn produced in the plane of the detector in which the light reflected from the disk is imaged. The desired use of a common detector for both wavelengths is thus impossible.

U.S. Pat. No. 6,043,911 discloses an appliance which uses scanning beams at two wavelengths, which are combined by means of a beam combination element in order to propagate along a common optical axis. This known appliance has the disadvantage that the beam combination element, which consists of a combination of a prism and a hologram, is costly to produce. Furthermore, the hologram is not optimally matched to different characteristics of the light sources that produce the different wavelengths, and this leads to more or less severe disturbance effects.

One object of the present invention is to propose an improved appliance. This object is achieved by the measures specified in the claims.

According to the invention, the beam combination element is in this case a diffraction grating. This has the advantage that its characteristics can be calculated, and can thus be optimally matched to the characteristics of the light sources which, in particular, are laser diodes. The characteristics of the diffraction grating are in this case preferably calculated using one of the calculation methods specified in the following text. The information layer is an information-carrying layer on the recording medium which, for example, may be an optical disk such as a CD, DVD, or else some other optical recording medium which can either only be read from, can only be written to, or can be both read from and written to.

The diffraction grating preferably has grating lines with a blaze profile or a profile which is similar to a blaze profile. In the case of a blaze profile, a grating line does not have a rectangular cross section, but an essentially obliquely running cross section. The profile is thus, for example, a sawtooth profile. One advantage of using a blaze profile is that the diffraction efficiency is used optimally, and as great an intensity as possible is coupled from each of the light sources into the combined beam path. This thus results in the minimum possible optical losses.

According to the invention, the grating lines are provided with a stepped profile. This blaze-like profile has the advantage that it can be produced with little effort but nevertheless has characteristics which are virtually just as good as a pure blaze profile.

The grating lines of the diffraction grating are preferably straight and parallel, which is advantageous since they can be produced easily. In many cases, this provides sufficiently good quality, particularly if the diffraction grating is arranged in the parallel beam. If the diffraction grating is arranged in the divergent or convergent beam, the grating lines are preferably designed such that they are curved. This has the advantage that, because the distances between the grating lines thus differ as a function of the location, the diffraction requirements, which differ as a function of the location, are satisfied in the non-parallel beam, and aberrations are corrected.

Even when using curved grating lines, at least one grating line is preferably straight. This has the advantage that the curvature of the grating lines can be determined particularly easily, starting from a straight grating line. The distance between this grating line and the optical axis preferably corresponds to half the distance between one of the light sources and the optical axis.

The invention provides for the diffraction grating to be optimized to the respective first-order diffraction for both wavelengths. Particularly when using the wavelength combination 650 nm, 780 nm, it is in each case optimal to use first-order diffraction with respect to the efficiency and simplicity of the grating architecture. Other combinations of diffraction orders are also worthwhile for other wavelength combinations. This also includes not only the zero order but also the second or higher orders.

In the simplest case, the laser diodes that produce light at different wavelengths are arranged such that the scanning beams produced by them run parallel to one another and parallel to the optical axis. The invention provides for both laser diodes to be arranged tilted with respect to the optical axis. This has the advantage that, in conjunction with the diffraction grating, this results in an intensity profile which is as axially symmetrical as possible.

The diffraction grating is also preferably arranged rotated with respect to the optical axis for this purpose. It is particularly advantageous for the laser diodes and the diffraction grating to be arranged rotated such that a zero-order virtual light source comes to rest on the optical axis.

According to the invention, the diffraction grating is furthermore oriented such that the side spots are oriented at right angles to information tracks on the optical recording medium. Side spots are focus points of secondary beams of a different order to those for which the diffraction grating is optimized. If required, these diffraction orders are deliberately planned for determining the diffraction grating profile with a suitable intensity. The information track is, for example, a spiral or circular track of elongated information markings on a conventional optical disk. The alignment of the diffraction grating according to the invention has the advantage that the side spots can be used to detect possible disk tilting or to detect any discrepancy between the scanning spot and the track centre, using known methods.

According to the invention, the laser diodes and the diffraction grating are integrated in one module. This has the advantage that the module is delivered as a prefabricated part, having been subjected to quality control, for installation, with fewer assembly and adjustment steps than being required during installation.

The diffraction grating is advantageously arranged in the beam path coming from the recording medium, but still upstream front of the photodetector. This has the advantage that the beam combination takes place only in the rearward path of the scanning beam. The diffraction grating can thus be designed to be simpler since any errors which may be caused by it have scarcely any effect in the remaining short beam path.

In this case, the diffraction grating and the detector element are advantageously integrated in one module, too.

A further diffraction grating is preferably arranged in the beam path. This has the advantage of producing further secondary beams which are used, for example, for tracking. If the further diffraction grating is a Ronchi grating, then this has the advantage that secondary beams are produced for only one of the wavelengths. This is particularly advantageous when further secondary beams, for example for carrying out the known three-beam tracking method, are intended to be used in any case for only one of the wavelengths.

The invention provides for only one of the two laser diodes to be operated in each case for reading from a recording medium, while both laser diodes are operated simultaneously in order to record information on the recording medium. The diffraction grating according to the invention ensures that the spots of both laser diodes are superimposed on the optical recording medium, so that the energy which is required for recording or deletion of data is advantageously applied by both laser diodes producing scanning beams simultaneously. Only one scanning beam is required in each case for reading from the recording medium. Different wavelengths are preferably provided for writing or deletion, although it is within the scope of the invention for the same wavelength to be used here.

One method according to the invention for producing a diffraction grating, in particular for use in an appliance according to the invention, is for the grating structure and the grating line profile to be defined, for a corresponding height profile to be determined from this and to be subdivided into a staircase profile, and for the areas of different height produced in this process to be transferred to a blank by means of lithography and an etching process.

Further advantageous refinements of the invention are contained in the following description of exemplary embodiments. In the figures.

Figures 1A, 1C:
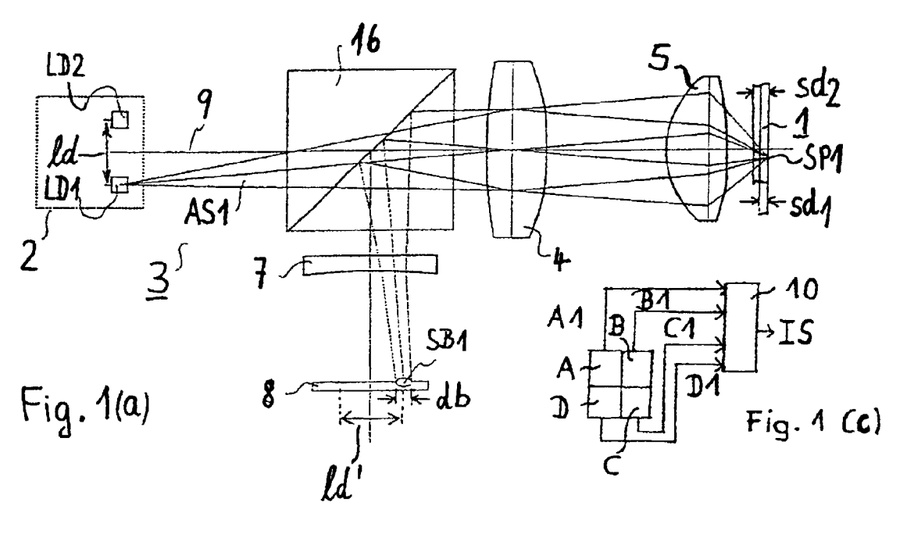
FIG. 1: shows a beam path using two laser diodes.
Figure 1B:
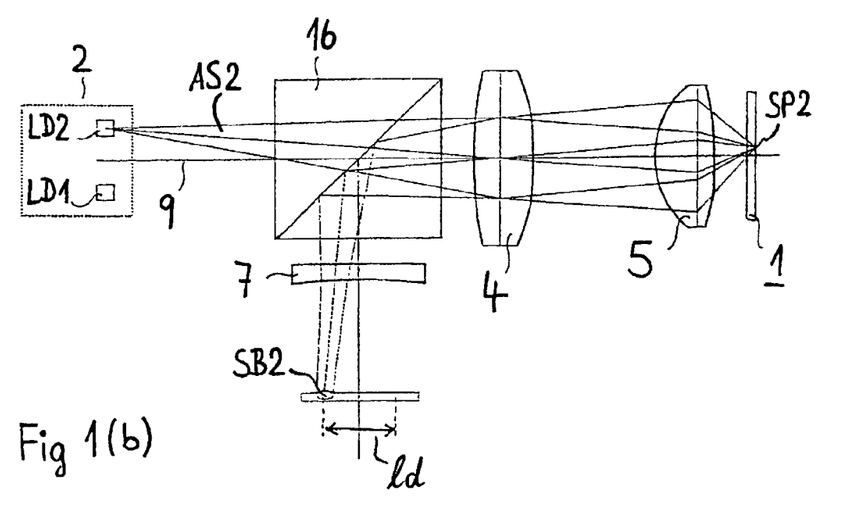

FIG. 1 shows the beam path in an optical scanner 3 of an appliances for reading from and/or writing to optical recording media 1, which has two laser diodes LD1, LD2. A so-called twin laser diode or dual laser diode comprises an arrangement of two separate laser diodes LD1, LD2, which are integrated in a common housing 2. For applications in the field of optical scanners 3 for reading from and writing to optical recording media 1, a first laser diode LD1 emits at a first wavelength $\lambda_1$=650 nm, and a second laser diode LD2 emits at a second wavelength $\lambda_2$=780 nm. The radiation at the second wavelength $\lambda_2$ is used in the illustrated case for reading from and writing to the older CD format, while the first wavelength $\lambda_1$ is used for the newer DVD formats. As a consequence of the various requirements for the different disk formats, all the components of the scanner 3 must be optimized for both wavelengths $\lambda_1$, $\lambda_2$. Thus, for example, the collimator lens 4 should have as little dispersion as possible and, furthermore, the objective lens 5 should compensate for the spherical aberration of the substrate thicknesses $sd_1$, $sd_2$, which are different for CDs and DVDs. The recording medium 1 in FIG. 1(*a*) is alternatively indicated with a substrate thickness $sd_1$ for DVDs and with a substrate thickness $sd_2$ for CDs. The beam paths for the different laser diodes LD1, LD2 are illustrated in separate figures, FIG. 1(*a*) and FIG. 1(*b*), for the sake of clarity. Appliances such as these are subject to the following problem: in principle, the optical scanner 3 is a diffraction-limited image of the laser source LD1, LD2 on the optical storage disk 1. In the case of a twin laser diode, both laser sources LD1, LD2 are separated laterally in the mounting housing 2. They produce two scanning beams AS1, AS2, which run along the optical axis 9 of the scanner 3. They pass through a beam splitter 16 and are imaged by the optical system comprising the collimator lens 4 and the objective lens 5 at two mutually separate spots SP1, SP2 on the information-carrying layer 6 on the optical disk 1. These two spots SP1, SP2 may in turn be regarded as light sources, which are imaged via the objective lens 5 and the cylindrical lens 7 in the plane of the detector 8. The detector 8 is illustrated tilted through 90° in FIG. 1*c* and, in the illustrated case, has four quadrants A, B, C, D, which emit a respective electrical signal A1, B1, C1, D1. These signals are converted in a known manner, which will not be explained in any more detail here, by an evaluation unit 10 to one or more information signals IS. As a consequence of the astigmatism which is introduced by the cylindrical lens 7, the images SB1, SB2 of the two light spots SP1, SP2 in the plane of the detector are no longer of a diffraction-limited extent, but of a size which is critically dependent on the focal length of the cylindrical lens 7. The original separation of the two spots SP1, SP2 is thus no longer ensured in their images SB1, SB2. The problem will be illustrated by a numerical example: the two laser sources LD1, LD2 are typically separated from one another laterally by about ld=0.1 mm. In the detector plane, this leads to images SB1, SB2 which are likewise separated from one another by about ld'=0.1 mm, depending on the focal length of the cylindrical lens 7. The cylindrical lens 7 itself is normally chosen such that this likewise results in an image SB1, SB2 of a spot SP1, SP2 on the detector 8 likewise having a diameter db of about db=0.1 mm. Thus, in practice, two mutually shifted spot images SB1, SB2, each having four quadrants A, B, C, D, can be found, whose separation corresponds approximately to their diameter db. One possible solution would be to use a detector pattern formed from two photodiodes each having four quadrants. However, this solution option is expensive to implement in practice, since the distance between the two spot images SB1, SB2 in the plane of the detector 8 varies during adjustment of the cylindrical lens 7. The fixed image separation as predetermined by a detector pattern can thus not be maintained during construction and adjustment of the optical scanner 3.

An optical arrangement is desirable which allows the use of a single detector 8 having four quadrants. The two spot images SB1, SB2 should thus meet at the same position in the detector plane. In principle, it is possible to distinguish between two different solution approaches for achieving this aim: firstly, the production of two spots SP1, SP2 on the disk 1, which are located laterally at the same position. This results in the two spot images SB1, SB2 being concentric in the detector plane. Secondly, the imaging of the spots SP1, SP2, which are laterally separated on the disk 1, at the same position in the detector plane.

Figure 2:
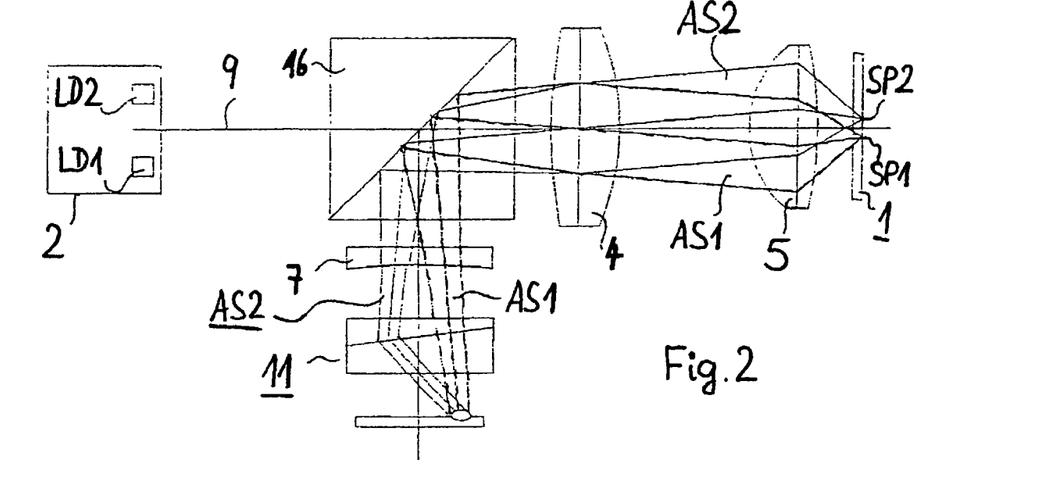
FIG. 2: shows a beam combination by means of a Wollaston prism.

For the latter, it is proposed that the birefringent characteristic of a Wollaston prism 11 be made use of in the detector path. This is illustrated in FIG. 2. For simplicity, the illustration shows only those scanning beams AS1, AS2 which run backwards from the recording medium 1 in the direction of the detector 8. While the scanning beam AS1 at the wavelength $\lambda_1$ strikes the Wollaston prism 11 as an ordinary beam, and leaves it again without being refracted, the scanning beam AS2 at the wavelength $\lambda_2$ is refracted, as an extraordinary beam. The arrangement is now chosen such that the images SB1, SB2 at the two wavelengths $\lambda_1$, $\lambda_2$ strike the detector 8 at the same lateral position. The choice of a Wollaston prism 11 for beam combination involves the following disadvantages: the polarization vectors of the two wavelengths must be at right angles to one another. This restricts the degree of freedom for variable orientation of the two laser diodes LD1, LD2. The production techniques mean that the two laser diodes LD1, LD2 can virtually never be aligned exactly with mutually perpendicular polarization in the housing. This makes adjustment considerably more difficult. The birefringence of the substrate of the recording medium 1 rotates the polarization as a function of the position of the optical scanner relative to the recording medium 1, particularly when using quarter-wave phase plates, which are normally used for writing drives but are not illustrated here.

The abovementioned disadvantages make it clear that beam combination using the polarization-dependent characteristics of materials is not desirable. A method according to the invention, which allows polarization-independent beam combination based on the two solution approaches mentioned above will be described in the following text.

Figure 3:
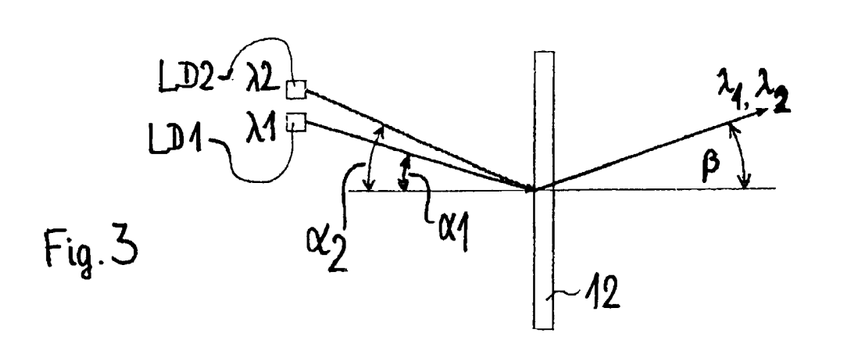
FIG. 3: shows a beam combination by means of a diffraction grating.

The basic principle of the invention as illustrated in FIG. 3 makes use, in the inverse sense, of the dispersive characteristic of a diffraction grating 12. While in the case of a grating spectrometer, the polychromic radiation which strikes the grating at a fixed incidence angle $\alpha$ leaves it again in accordance with the grating equation $$n*\lambda = d*(\sin(\alpha) - \sin(\beta)) \quad (1)$$

at different angles $\beta$ in der n-th diffraction order, the radiation at the different wavelengths $\lambda_1$ and $\lambda_2$ in this case strikes the diffraction grating 12 at the angles $\alpha_1$ and $\alpha_2$. The grating period d is chosen such that it results in identical exit angles $\beta_1$ and $\beta_2$ in accordance with the grating equation. Thus, for $\beta_1 = \beta_2 = 0$:

$$n_1 * \frac{\lambda_1}{d} - \sin(\alpha_1) = 0; \quad n_2 * \frac{\lambda_2}{d} - \sin(\alpha_2) = 0, \quad (2)$$

where $n_1$ and $n_2$ describe the diffraction orders used for beam combination. These are chosen to be independent of one another from the start. For example, it is possible to choose $n_1 = 0$ and $n_2 = 1$, which, with $\alpha_1 = 0$, results in the required grating period becoming:

$$d = \frac{1}{\lambda_2 + \sin(\alpha_2)} \quad (3)$$

Corresponding solutions of equation (2) are obtained for other combinations of the diffraction orders $n_1$ and $n_2$. The radiation emitted at the wavelengths $\lambda_1$ and $\lambda_2$ from the two laser diodes strikes the diffraction grating at the angles $\alpha_1$ and $\alpha_2$ with respect to the normal to the surface. The figure shows the exit angle $\beta$ which, according to the invention, is chosen to be the same for both wavelengths.

Figure 4A:
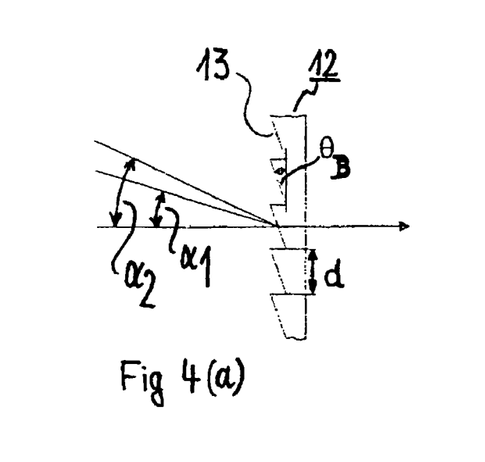
FIG. 4: shows a line profile of a diffraction grating.
Figure 4B:
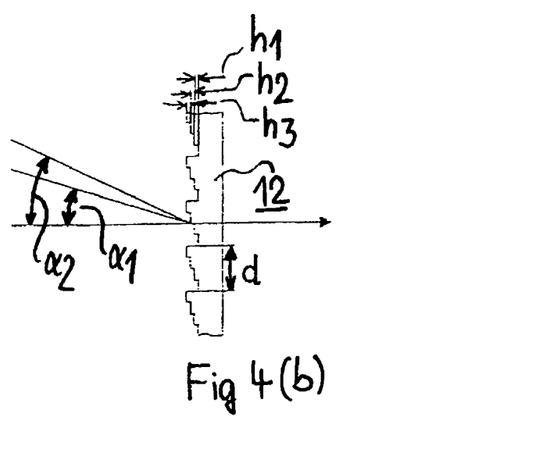

FIG. 4 shows optimization according to the invention of the line profile of the diffraction grating 12. A blaze profile is used for this purpose in FIG. 4(a), while a stepped profile is used as an approximation of the blaze profile in FIG. 4(b). The stepped profile is in this case represented by 4 height steps. The equidistant steps $h_1$, $h_2$, $h_3$ are chosen such that, on average, they correspond to the blaze angle $\theta_B$ as shown in FIG. 4(a).

The suitable choice of the diffraction orders $n_1$ and $n_2$ is made, according to the invention, by-additionally taking into account the diffraction efficiency $\epsilon$. The diffraction efficiency $\epsilon$ determines which components of the emitted laser light at the wavelengths $\lambda_1$, $\lambda_2$ is available for the optical system of the scanner 3. In principle, the diffraction efficiency $\epsilon$ is not only dependent on the choice of the diffraction order $n_1$, $n_2$, but is critically dependent on the structure factor of the diffraction grating 12, that is to say on the profile of the individual grating lines 13. FIG. 4 illustrates examples of such a profile of the grating lines 13. The asymmetrically formed blaze profile illustrated in FIG. 4(a) is, according to the invention, particularly suitable for concentrating as large a proportion as possible of the diffractive radiation in only one diffraction order n. If the blaze condition $$2\pi * \frac{x}{d} = \frac{2\pi}{n*\lambda} * (n_r - 1) * h(x) \rightarrow h(x) = \frac{n*\lambda}{d} * \frac{x}{n_r - 1} \quad (4)$$

is satisfied exactly for such a diffraction grating 12 whose substrate is characterized by the diffractive index $n_r$, then a diffraction efficiency of $\epsilon = 1$ is obtained for the corresponding order n, and $\epsilon = 0$ for all other orders. In fact, it is evident from FIG. 4(a) and equation (4) that the blaze condition cannot be satisfied simultaneously for both wavelengths $\lambda_1$ and $\lambda_2$. The diffraction efficiency $\epsilon$ is given by $$\epsilon(n) = |\alpha(n)|^2, \quad (5)$$

where $\alpha(n)$ describes the complex amplitude diffraction efficiency. The variable $\alpha(n)$ can be calculated for grating periods that are not excessively small by:

$$a(n) = \frac{1}{d} \int_0^d \exp(i\phi(x)) * \exp\left(-i2\pi n \frac{x}{d}\right) dx \quad (6)$$

where $\Phi(x)$ describes the relative phase of a beam that strikes the grating step at the point x. For a blaze grating:

$$\phi(x) = 2\pi \frac{n_r - 1}{n * \lambda} h(x), \quad (7)$$

where h(x) represents the height profile of a grating line 13. The relationship with the blaze angle shown in FIG. 4(*a*) is given by:

$$h(x)=\tan(\theta_B)*x \text{ for } x \in [0,d] \quad (8)$$

If the grating profile is optimized for the wavelength $\lambda_1$ in the diffraction order $n_1$, then this results, for the wavelength $\lambda_2$ in the order $n_2$, in:

$$\varepsilon(n_2) = \frac{2 - 2*\cos\left(2\pi*\left(n_1*\frac{\lambda_1}{\lambda_2} - n_2\right)\right)}{(2\pi)^2 * \left(n_1*\frac{\lambda_1}{\lambda_2} - n_2\right)^2} \quad (9)$$

on the assumption that the dispersion of the grating subtrate, that is to say the change in $n_r$ with wavelength, is negligible.

Figure 11:
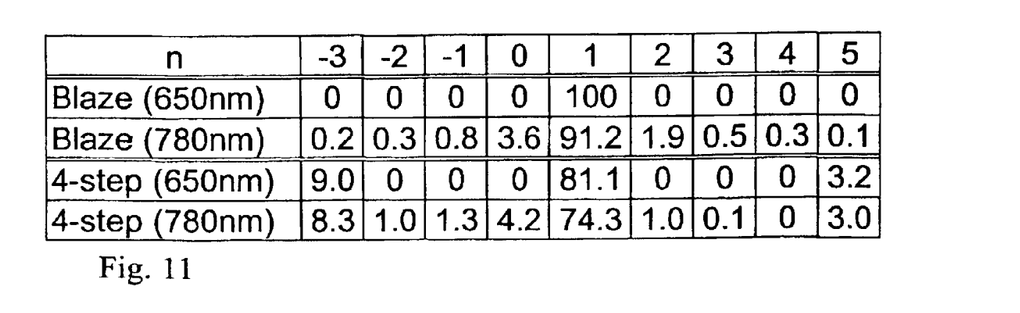
FIG. 11: shows a table of calculated diffraction efficiency.

It has been found that, in order to achieve a maximum light yield for both wavelengths for a given ratio of $\lambda_1/\lambda_2=0.833$, it is particularly advantageous to choose the diffraction orders to be $n_1=n_2=\pm 1$. As an example, FIG. 11 shows the diffraction efficiency $\varepsilon$ for the various diffraction orders n, assuming a grating profile with which the blaze condition is satisfied exactly for the wavelength $\lambda_1=650$ nm in the first order. This blaze condition is correspondingly contravened for the wavelength $\lambda_2=780$ nm. However, owing to the relatively small difference between the wavelengths $\lambda_1, \lambda_2$, it is evident that a diffraction efficiency $\varepsilon$ of more than 90% can also be achieved for $\lambda_2$. In addition, FIG. 11 lists the diffraction efficiencies which result with the grating profile, in this case in the form of a 4-step profile, as sketched in FIG. 4(*b*) and formed from four discrete steps. A profile such as this can be produced more easily by lithographic exposure and subsequent etching processes than the ideal blaze profile, which needs to be manufactured mechanically. The step heights $h_1$, $h_2$, $h_3$ and the number of steps are in this case chosen to achieve the best possible approximation to the optimized blaze profile. The diffraction efficiencies indicated in FIG. 11 for this profile were determined by numerical evaluation of equation (5). In this case as well, it was found that a yield of more than 70% can be achieved for both wavelengths $\lambda_1$, $\lambda_2$.

Specific arrangements in optical scanners for beam combination will be described in the following text, in particular for diffraction orders $n_1=n_2=\pm 1$.

Figure 5:
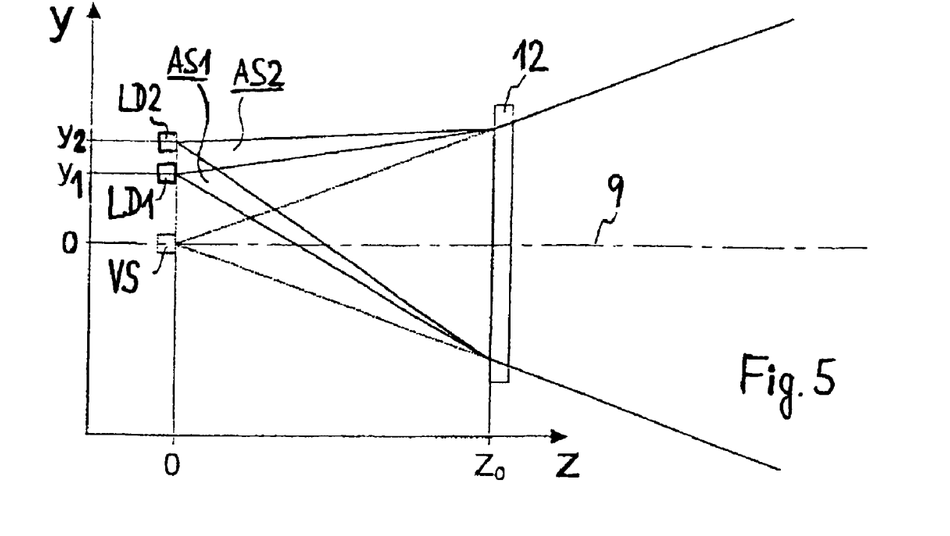
FIG. 5: shows a beam path using a diffraction grating.

FIG. 5 shows the beam path of an appliance according to the invention for beam combination in the divergent scanning beam AS1, AS2. The radiation which is emitted in a divergent manner from the two laser diodes LD1 and LD2 has no aberrations after diffraction at the diffraction grating 12 and propagates as if both wavelengths originated from the same point, the virtual source VS. The two laser diodes LD1 and LD2 are in this case regarded as point light sources. After diffraction at the diffraction grating 12, the radiation from the two light sources LD1, LD2 propagates as if they originated in a single source, the so-called virtual source VS. With regard to the virtual source VS, the two actual sources LD1, LD2 are located at the lateral coordinate points (0, $y_1$) and (0, $y_2$), respectively. The diffraction grating 12 is located at a longitudinal distance $Z_0$. The beams which strike the diffraction grating 12 centrally, that is to say at the coordinate ($Z_0$, 0) run along the optical axis 9 after diffraction, and the exit angle $\beta$ for both beams AS1, AS2 is zero. The incidence angles $\alpha_1$ and $\alpha_2$ can be determined on the one hand from the geometry of the arrangement to be:

$$y_1=Z_0*\tan(\alpha_1); y_2=Z_0*\tan(\alpha_2) \quad (10)$$

On the other hand, they must satisfy the grating equation (1) for $\beta=0$, so that this results in the condition:

$$\Delta y = y_2 - y_1 = Z_o * \left(\tan\left(\arcsin\frac{\lambda_2}{d}\right) - \tan\left(\arcsin\frac{\lambda_1}{d}\right)\right) \approx \frac{Z_0}{d}(\lambda_2 - \lambda_1) \quad (11)$$

consigned with the last step in equation (11) being applicable and at the limit where $\lambda_{1,2}<<d$. Equation (11) allows the grating constant d, as required for recombination, and the position $y_1$ to be determined for a given distance $\Delta y$ between the laser diode LD1 and the laser diode LD2. For example, a grating constant of d=13 µm and a position $y_1$=0.5 mm are obtained for $Z_0$=10 mm and $\Delta y$=0.1 mm.

If a simple linear diffraction grating 12 with a period corresponding to equation (11) is used, the combination of the two scanning beams AS1, AS2 is ensured, but there is no diffraction-limited spot SP1, SP2 on the information-carrying layer 6 of the recording medium 1. This is due to aberrations which occur during diffraction of the divergent beam AS1, AS2 on the linear grating. In order to prevent this, the diffraction grating 12 according to the invention is structured to be far more complex than a simple diffraction grating.

Figure 6:
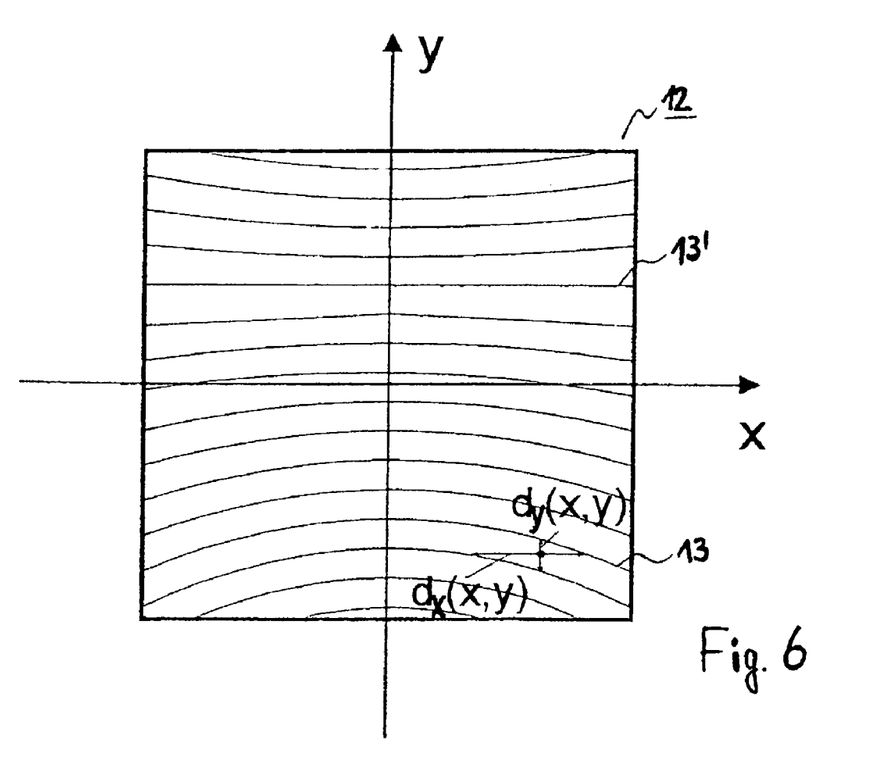
FIG. 6: shows a line structure of a diffraction grating according to the invention.

FIG. 6 shows the line structure of an optimized diffraction grating 12 with curved grating lines 13. As can be seen, one grating line 13' is not curved. The line separation d is in this case described in cartesian form as a function of the coordinates (x,y) by $d_x(x,y)$ and $d_y(x,y)$.

The correct structure of the diffraction grating 12 is determined, as described in the following text, for the radiation from the laser diode LD1. Perfect correction for all aberrations is possible only for the wavelength $\lambda_1$, $\lambda_2$ of one of the two laser diodes LD1, LD2. The finite aberrations in the radiation from the laser diode LD2 are negligible, as shown by numerical simulation calculations.

Each beam which originates from the laser diode LD1, that is to say from the point (0,$y_1$) and which strikes the diffraction grating 12 at the point ($x_a$,$y_a$) is intended to be diffracted such that the resultant beam corresponds to that which is produced at the virtual source VS at the point (0,0) and passes through the point ($x_a$,$y_a$) without being diffracted. This means that the exit direction of the diffracted beam is equal to the incidence direction of the virtual beam. In order to allow the diffraction on curved grating lines 13 to be described correctly, the grating period, as illustrated in FIG. 6, is broken down into the Cartesian coordinates $d_x$ and $d_y$ for each grating coordinate (x,y). The incidence angle $\alpha$ is subdivided in a corresponding way into its components $a_x$ and $a_y$.

Thus, for a beam from (0,$y_1$) to ($x_a$,$y_a$) at the distance $Z_0$:

$$\alpha_x(a_a, y_a) = \arctan\left(\frac{x_a}{\sqrt{Z_0^2 + (y_a - y_1)^2}}\right) \quad (12)$$

-continued $$a_y(x_a, y_a) = \arctan\left(\frac{y_a - y_1}{\sqrt{Z_0^2 + x_a^2}}\right)$$

The virtual beam from the virtual source VS governs the nominal exit angle β, which is likewise represented in the form of components. This is equal to the incidence angle of the virtual beam, such that:

$$\beta_x(x_a, y_a) = \arctan\left(\frac{x_a}{\sqrt{Z_0^2 + y_a^2}}\right) \quad (13)$$

$$\beta_y(x_a, y_a) = \arctan\left(\frac{y_a}{\sqrt{Z_0^2 + x_a^2}}\right)$$

The grating periods $d_x(x_a,y_a)$ and $d_y(x_a,y_a)$ are chosen such that the grating equation (1) with the angles $\alpha_x$, $\alpha_y$, $\beta_x$, $\beta_y$ calculated above is satisfied at each point $(x_a, y_a)$ for the first diffraction order. Thus:

$$d_x(x_a, y_a) = \frac{\lambda_1}{\sin\left(\arctan\left(\frac{y_a - y_1}{\sqrt{Z_0^2 + x_a^2}}\right)\right) - \sin\left(\arctan\left(\frac{y_a}{\sqrt{Z_0^2 + x_a^2}}\right)\right)} \quad (14)$$

$$d_x(x_a, y_a = \frac{\lambda_1}{\sin\left(\arctan\left(\frac{x_a}{\sqrt{Z_0^2 + (y_a - y_1)^2}}\right)\right) - \sin\left(\arctan\left(\frac{x_a}{\sqrt{Z_0^2 + y_a^2}}\right)\right)}$$

The diffraction grating is completely characterized by equation 14 and can be subdivided into individual grating lines 13. According to the invention, the grating line 13' at $y_a=y_1/2$ is a suitable point of origin for the line structure. In this case, the denominator of $d_x$ has a singularity, which means that the grating line 13' runs parallel to the x axis. The profile of all the other grating lines 13 can be calculated by successive addition of $d_y$. The structure of the diffraction grating 12 as illustrated in FIG. 6 corresponds qualitatively to the structure calculated in this way.

Figure 7:
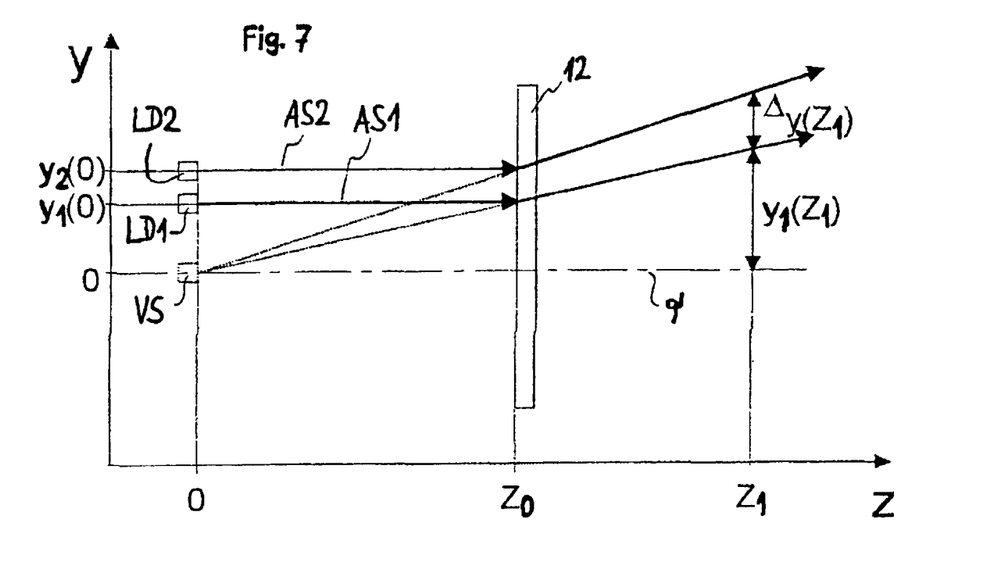
FIG. 7: shows a beam path for laser diodes arranged offset with respect to the optical axis.

FIG. 7 shows the beam path for for laser diodes LD1, LD2 which are arranged offset with respect to the optical axis 9. The bold arrows in this case indicate the emission angles of the intensity maxima. The two laser diodes LD1 and LD2 are normally arranged such that the angle distribution of the intensity profile is aligned parallel to the Z axis. The lateral distance $\Delta y(Z_1)$ between the intensity maxima depends on the distance $y_2(0)-y_1(0)$ between the laser diodes LD1, LD2 and the propagation distance $Z_1-Z_0$.

The description so far has ignored the emission characteristic of the laser diodes. The laser diodes LD1 and LD2 have been assumed to be point light sources whose radiation has no specific angle distribution. FIG. 7 shows the direction in which the intensity maxima finally move, or how their lateral separation $\Delta y(Z_1)$ increases in the longitudinal direction. Thus, for this separation:

$$\Delta y(Z_1) = \frac{y_2(0) - y_1(0)}{Z_0} * Z_1 \quad (15)$$

Figure 8:
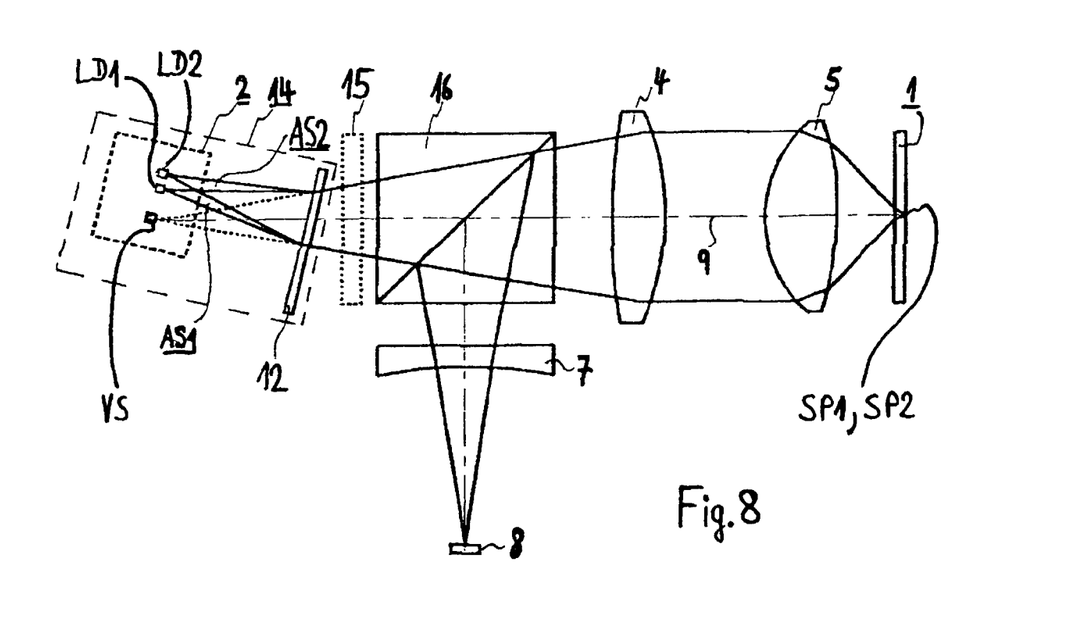
FIG. 8: shows an appliance according to the invention having a diffraction grating in the divergent beam.

If a collimator lens 4 is located at $Z_1$, then the distance $\Delta y(Z_1)$ remains constant for $Z>Z_1$. $y_2-y_1=0.1$ mm, $Z_0=10$ mm and $Z_1=20$ mm will once again be assumed as a numerical example. This thus results in the emission maxima being separated by 0.2 mm. This value is small in comparison to the typical aperture diameter of an objective lens 5 of about 3-4 mm. This means that, in practice, the separation between the intensity maxima is scarcely evident. In contrast, the shift in the emission maxima with respect to the axis 9' that is shown is more critical. This shift $y_1(Z_1)$ will assume approximately five times the value of $\Delta y(Z_1)$. For the above numerical example, this means that the intensity maximum is shifted through about 1 mm with respect to the optical axis 9'. This shift thus amounts to approximately ¼ of the lens aperture, and should thus be corrected. According to the invention, this is done as follows: the wave fronts that emerge from the diffraction grating 12 correspond to spherical waves which originate from an emission point at the virtual source VS. It is thus possible to rotate the subsequent optical system at any desired angles about the point VS without the previous steps for definition of the diffraction grating 12 becoming invalid. There is thus no change in the characteristics of the combined beams AS1, AS2, either, unless the characteristics of the diffraction grating 12 are changed. The rotation to be carried out is effectively provided at an angle such that the intensity maximum of the laser diode LD1 lies on the optical axis 9 of the subsequent system. FIG. 8 shows a correspondingly optimized overall system.

FIG. 8 shows the overall structure of the optical scanner 8 with the diffraction grating 12 in the divergent beam. In order to keep the shift of the intensity maxima of the two laser diodes LD1, LD2 with respect to the optical axis 9 of the optical system following the diffraction grating 12 as small as possible, the unit comprising the laser diodes LD1, LD2 and the diffraction grating 12 is rotated about an axis which is at right angles to the plane of the drawing and runs through the virtual source VS. The optimum rotation angle is the mean value of the emission angles of the two laser diodes LD1, LD2 after passing through the diffraction grating 12.

According to the invention, when using a corresponding small distance $Z_0$, a module 14 is provided as an integrated overall component, comprising a twin laser diode LD1, LD2 and a diffraction grating 12. The orientation of the optical system relative to the diffraction grating 12 is chosen such that the remaining diffraction orders of the diffraction grating 12 result in light spots which are oriented at right angles to the tracks on the optical disk 1. When using additional detector elements, which are not illustrated here, these side spots are used to detect radial tilting of the optical disc. A further grating 15 is shown, as an option. This is used to detect any tracking error during reproduction of a CD disk, based on the known three-beam tracking method. Its grating lines are for this purpose oriented approximately at right angles to those of the diffraction grating 12, so that the side spots which result from the further grating 15 on the disk 1 are aligned along the tracks. Since the further grating 15 is not required for reading from DVD disks, the invention provides for such a grating to be used in which no diffraction occurs for the wavelength $\lambda_1$. This is the case, for example, for a Ronchi grating with $\Delta\Phi=\pi$ for 650 nm.

Figure 9:
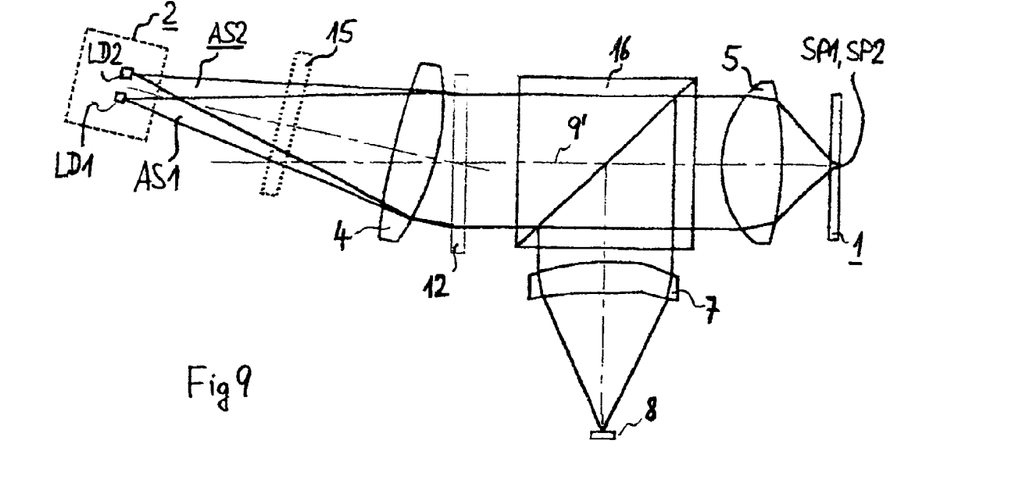
FIG. 9: shows an appliance according to the invention having a diffraction grating in the parallel beam.

The beam combination in the collimated beam is simpler than in the case described above. In this case, as is illustrated in FIG. 9, the radiation AS1, AS2 which emerges in a divergent form from the laser diodes LD1 and LD2 is first of all collimated by means of an appropriate collimator lens 4. Owing to the different object positions of the laser diodes LD1 and LD2, the collimated beam comprising the wavelengths $\lambda_1, \lambda_2$ has different field angles. These are matched to one another by the diffraction grating 12 according to the invention, which is located in the collimated beam. The diffraction of a collimated beam from a linear grating does not result in any aberrations, and the diffraction grating 12 is advantageously in the form of a simple diffraction grating. In order to achieve a maximum photon yield for both wavelengths $\lambda_1, \lambda_2$, both laser fields are diffracted in the respective first order, as already described. The grating period is designed taking into account the difference between the field angles $\Delta\alpha=\alpha_2-\alpha_1$ of the collimated beams, such that:

$$2*\tan\left(\frac{\Delta\alpha}{2}\right) = \frac{\Delta y}{f_{coll}} \rightarrow \Delta\alpha = 2*\arctan\left(\frac{\Delta y}{2*f_{coll}}\right) \quad (16)$$

where $f_{coll}$ describes the focal length of the collimator lens 4. Subject to the condition $\beta=0$, equation (2) is used to uniquely define the grating periode d and the incidence angle $\alpha_1$:

$$d = \frac{\lambda_1}{\sin(\alpha_1)} = \frac{\lambda_2}{\sin(\alpha_1 + \Delta\alpha)} \quad (17)$$

Numerical example: for a collimator focal length of $f_{coll}=20$ mm and a lateral separation $\Delta y=0.1$ mm, this results in $\Delta\alpha=0.286°$. Using equation (17), the angle and grating period can be defined as $\alpha_1=1.43°$ and $d=26$ μm, respectively.

Figure 10:
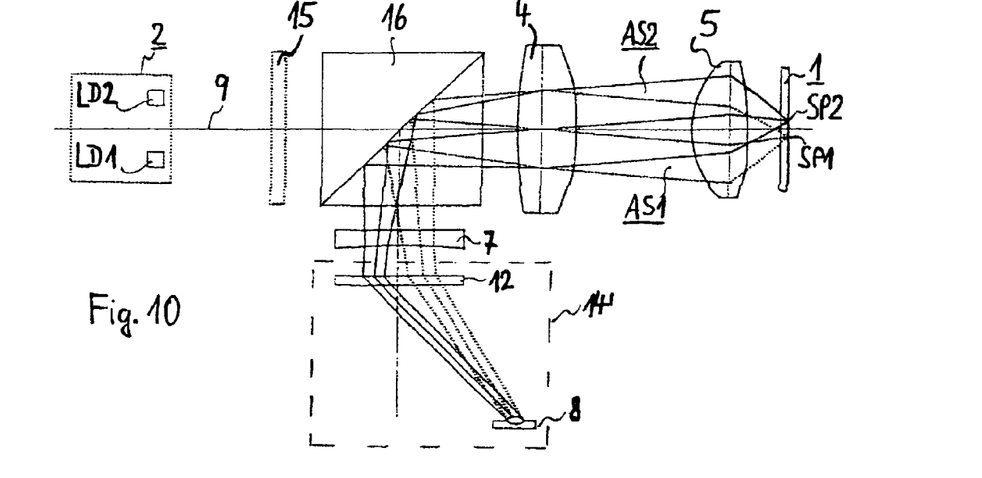
FIG. 10: shows an appliance according to the invention with a diffraction grating in the verification path.

FIG. 10 shows the beam combination in the backward path of an appliance according to the invention. The diffraction grating 12 is in this case arranged in the verification path of the opticals scanner 8. This arrangement corresponds to that illustrated in FIG. 2, with a diffraction grating 12 according to the invention being used for beam combinations, instead of the Wollaston prism 11. In this case, the radiation emitted from the two laser diodes LD1 and LD2 is initially not combined so that, as is shown in FIG. 1, two laterally separate spots SP1, SP2 are produced on the information layer 6 on the optical disk 1. The boundary condition that both spots SP1, SP2 are imaged at the same position SB1, SB2 in the detector plane is in this case satisfied by the diffraction grating 12 in the backward path. The structure of the diffraction grating 12 may in this case be in the form of a simple linear grating, even if it is located in the non-parallel beam path. The aberrations which result from the diffraction on the linear grating are negligible at this point, in contrast to the structure described in conjunction with FIGS. 5-8. For photon yield reasons, the diffraction grating 12 is once again used for both wavelengths $\lambda_1, \lambda_2$ in the first diffraction order. A module 14', which contains the diffraction grating 12 and the detector 8, is illustrated by dashed lines, as an alternative.

Additional application options for the invention are specified in the following text. The first two options for beam combination result in two overlapping light spots SB1, SB2 being produced on the optical disk 1. During normal operation of an optical scanner 8, the successive use of the two wavelengths $\lambda_1, \lambda_2$ is preferred, that is to say the laser diode LD1 at the wavelength $\lambda=650$ nm for DVDs, and the laser diode LD2 at the wavelength $\lambda=780$ nm for CDs, with the method according to the invention opening at novel applications for optical data storage. These include, for example, the so-called two-photon processes. These processes make use of a memory layer 6 on the disk 1, which uses molecular electronic transitions for writing an information unit. In this case, the molecular transition from a state ZA to another state ZB takes place via an intermediate level ZC. Light from the laser diode LD1 is used, by way of example, to stimulate the transition ZA→ZC, while the transition ZC→ZB is stimulated by the radiation from the laser diode LD2. In contrast, the information that has been written is read using only one of the two laser diodes LD1, LD2. The use of such two-photon processes will make it possible to achieve greater data reliability in the future. So-called "pre-heat" processes are envisaged as a further novel application of the overlapping spots SP1, SP2. In this case, by way of example, the light from the laser diode LD2 ensures that a large area of the memory layers 6 on the optical disk is heated up, while the information is written to the memory layer 6 only by appropriate pulses of the laser diode LD1. This likewise has advantages over the present day methods in terms of better data reliability with regard to deletion processes and the higher performance densities that can be achieved. Higher performance densities are desirable, for example, in the case of optical storage disks 1 with a number of information-carrying layers 6.

The invention relates to a diffractive method for forming the radiation emitted from the two laser diodes LD1, LD2, so that it is possible to use a single detector 8. On the one hand, a way is indicated to achieve two colinearly arranged foci SP1, SP2 on the optical disk 1, so that a single detector 8 can be used. On the other hand, a way is described for imaging the light spots SP1, SP2, which are separated on the optical disk 1, on a common detector 8. The use of a Wollaston prism 11 has the following disadvantages: the polarization of the laser diodes LD1, LD2 cannot be chosen freely. It cannot be used in the forward path, and laterally separate spots SP1, SP2 occur on the disk 1. Wollaston prisms 11 are comparatively expensive optical components, since they cannot be manufactured from plastic. The use of the diffraction grating 12 makes it possible, according to the invention, for the radiation which is emitted from two laterally separated monochromatic light sources, in this case laser diodes LD1, LD2, to be-formed such that the light beams at the two wavelengths $\lambda_1, \lambda_2$ have a common axis 9 after passing through the diffraction grating 12. This makes it possible to achieve a simple concept for an optical scanner 8 for replaying and for recording DVDs and CDs. The dispersive characteristic of the diffraction in the grating is used for combination of the radiation, with the first diffraction order n=±1 being used for both wavelengths $\lambda_1, \lambda_2$. A complex line structure for correction aberrations is described for use in the forward path of the scanner 8. In order to achieve a diffraction efficiency that it as high as possible for both wavelengths $\lambda_1, \lambda_2$, that is to say in order to achieve low light losses, a blaze geometry in discrete form is used for the step shape of the diffraction grating 12. Pre-heat recording and two-phonton processes are mentioned as further possible applications of the method.

What is claimed is:

1. Appliance for reading from and/or writing to an optical recording medium, the appliance having a first laser diode for producing a first scanning beam at a first wavelength and having a second laser diode for producing a second scanning beam at a second wavelength, the scanning beams scanning an information layer on the optical recording medium and falling on a single photodetector in order to produce an information signal, with a beam combination element being arranged at a point on the optical axis for combining the scanning beams such that both scanning beams run along the optical axis towards the optical recording medium in such way as if they originated in a single virtual light source, wherein the beam combination element is a diffraction grating which is optimized for both wavelengths to a diffraction order higher than zero, and wherein the virtual light source does not coincide with either of the first laser diode and the second laser diode.

2. Appliance according to claim 1, wherein the diffraction grating has grating lines with a Blaze profile.

3. Appliance according to claim 2, wherein the grating lines have a stepped profile.

4. Appliance according to claim 1, wherein the diffraction grating has curved grating lines.

5. Appliance according to claim 4, wherein one grating line is straight.

6. Appliance according to claim 1, wherein the diffraction grating is optimized to first diffraction order for both wavelengths.

7. Appliance according to claim 1, wherein the first laser diode and the second laser diode are arranged tilted with respect to the optical axis.

8. Appliance according to claim 1, wherein the diffraction grating is arranged tilted with respect to the optical axis.

9. Appliance according to claim 1, wherein the first laser diode, the second laser diode and the diffraction grating are integrated in one module.

10. Appliance according to claim 1, wherein the diffraction grating is arranged upstream of the photodetector in the beam path coming from the recording medium.

11. Appliance according to claim 10, wherein the diffraction grating and the photodetector are integrated in one module.

12. Appliance according to claim 1, wherein a further diffraction grating, in particular a Ronchi grating, is arranged in the beam path.

13. Appliance according to claim 1, wherein both laser diodes are in operation simultaneously in order to record information on the optical recording medium, while only one of the laser diodes is in each case in operation for reading.

* * * * *

UNITED STATES PATENT AND TRADEMARK OFFICE
CERTIFICATE OF CORRECTION

PATENT NO. : 7,596,070 B2  Page 1 of 1
APPLICATION NO. : 10/296799
DATED : September 29, 2009
INVENTOR(S) : Dambach et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1033 days.

Signed and Sealed this

Twenty-eighth Day of September, 2010

David J. Kappos
*Director of the United States Patent and Trademark Office*